United States Patent
Kim et al.

(10) Patent No.: US 11,274,970 B1
(45) Date of Patent: Mar. 15, 2022

(54) INTEGRATED OPTICAL-MICROWAVE PHASE DETECTING APPARATUS AND METHOD BASED ON 3X3 MMI COUPLER

(71) Applicant: KOREA ADVANCED INSTITUTE OF SCIENCE AND TECHNOLOGY, Daejeon (KR)

(72) Inventors: Jungwon Kim, Daejeon (KR); Kyoungsik Yu, Daejeon (KR); Youngjae Jeong, Daejeon (KR); Chan-Gi Jeon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 308 days.

(21) Appl. No.: 16/686,349

(22) Filed: Nov. 18, 2019

(30) Foreign Application Priority Data

Feb. 28, 2019 (KR) .......................... 10-2019-0024404

(51) Int. Cl.
   *G01J 9/02* (2006.01)
   *G02B 6/293* (2006.01)

(52) U.S. Cl.
   CPC .......... *G01J 9/02* (2013.01); *G01J 2009/0226* (2013.01); *G02B 6/29344* (2013.01)

(58) Field of Classification Search
   CPC .... G01J 9/02; G01J 2009/022; G02B 6/29344
   See application file for complete search history.

(56) References Cited

U.S. PATENT DOCUMENTS

| | | | |
|---|---|---|---|
| 2020/0091673 A1* | 3/2020 | Kim | .................. H01S 3/1398 |
| 2020/0264289 A1* | 8/2020 | Kim | ..................... G01S 17/88 |

FOREIGN PATENT DOCUMENTS

| | | |
|---|---|---|
| JP | 5625486 | 12/2011 |
| JP | 2012-227640 | 11/2012 |
| KR | 10-2011-0132777 | 12/2011 |
| KR | 10-2013-0090544 | 8/2013 |
| KR | 10-1331980 | 11/2013 |
| KR | 10-1388727 | 4/2014 |
| KR | 10-1866691 | 6/2018 |

OTHER PUBLICATIONS

K. Jung and J. Kim, Subfemtosecond synchronization of microwave oscillators with mode-locked Er-fiber lasers, Opt. Lett. 37, 2958-2960, Jul. 15, 2012.
C. Jeon, Y. Na, B. Lee and J. Kim, Simple-structured, subfemtosecond-resolution optical-microwave phase detector, Opt. Lett. 43, 3997-4000, Aug. 2018.

* cited by examiner

*Primary Examiner* — Mark R Gaworecki
(74) *Attorney, Agent, or Firm* — Lex IP Meister, PLLC

(57) ABSTRACT

The present disclosure relates to an integrated phase detector. In an embodiment, a first multi-mode interference coupler that receives the optical signal and outputs optical signals with a plurality of modes, and a second multi-mode interference coupler that receives one of the optical signals with the plurality of modes and a modulated signal generated through performing a phase modulation on another of the optical signals with the plurality of modes by the microwave signal, and outputs a first optical interference signal and a second optical interference signal may be included.

14 Claims, 12 Drawing Sheets

INTEGRATED OPTICAL-MICROWAVE PHASE DETECTING APPARATUS AND METHOD BASED ON 3X3 MMI COUPLER

CROSS-REFERENCE TO RELATED APPLICATION

This application claims priority to and the benefit of Korean Patent Application No. 10-2019-0024404 filed in the Korean Intellectual Property Office on Feb. 28, 2019, the entire contents of which are incorporated herein by reference.

BACKGROUND

(a) Field

The present invention relates to a microwave photon phase detection apparatus for detecting the phase of a microwave signal and on optical signal. In particular, the present invention relates to an optical-microwave phase detection method and apparatus integrated as a planar chip.

(b) Description of the Related Art

An oscillator with very low phase noise is a very important component ranging from large science facilities such as a phased array antenna and a particle accelerator to a precision defense system such as a GPS and a radar. Further, the oscillator is an essential element for a high performance measurement equipment such as a spectrum analyzer and a signal source analyzer.

Conventionally, a phase detection apparatus based on an optical fiber is used to detect a phase between an optical signal and microwave signal. As technology advances, the necessity of implementing a phase detection apparatus in a circuit is increasing, and therefore the development of a new phase detection structure that can be integrated is required.

SUMMARY

According to one embodiment, an integrated phase detector for detecting a phase error between an optical signal and a microwave signal is disclosed. The phase detector includes a first multi-mode interference coupler that receives the optical signal and outputs optical signals with a plurality of modes, and a second multi-mode interference coupler that receives one of the optical signals with the plurality of modes and a modulated signal generated through performing a phase modulation on another of the optical signals with the plurality of modes by the microwave signal, and outputs a first optical interference signal and a second optical interference signal.

The phase detector may further include a bias unit that biases a phase of either the first optical interference signal or the second optical interference signal.

The bias unit may bias the phase to have a maximum sensitivity when a phase difference between the first optical interference signal and the second optical interference signal is zero.

The bias unit may bias the phase in response to a fabrication error of the second multi-mode interference coupler.

The phase detector may further include a balanced optical detector that detects an electrical signal corresponding to a timing error between the optical signal and the microwave signal, by converting, to the electrical signal, information of an intensity difference between the first optical interference signal and the second optical interference signal that are output from the second multi-mode interference coupler.

The first multi-mode interference coupler may be a 2×2 multi-mode interference coupler having two input ports and two output ports, and the second multi-mode interference coupler may be a 3×3 multi-mode interference coupler having three input ports and three output ports.

The phase detector may further include a phase modulator that modulates an optical signal output from the first multi-mode interference coupler by using the microwave signal.

According to another embodiment, an integrated phase detector for detecting a phase error between an optical signal and a microwave signal is disclosed. The phase detector includes a multi-mode interference coupler that generates a first optical signal and a second optical signal by dividing an input optical signal, makes a loop for two different ports, propagates the first optical signal and the second optical signal to the opposite directions, respectively, makes an interference on a modulated signal that is phase modulated by the microwave signal input to the loop, and outputs a first optical interference signal and a second optical interference signal generated by the interference.

The phase detector may further include an isolator that is connected to a port to which the optical signal of the multi-mode interference coupler is input and prevents reflection of the optical signal.

The loop may be made for a first output port of the multi-mode interference coupler and a third output port of the multi-mode interference coupler that is not adjacent to the first output port.

The phase detector may further include a uni-directional phase shifter that shifts a phase of the microwave signal that is input to the loop only in a specific direction.

The phase detector may further include a balanced optical detector that detects an electrical signal corresponding to a timing error between the optical signal and the microwave signal, by converting, to the electrical signal, information on an intensity difference between the first optical interference signal and the second optical interference signal that are output from the multi-mode interference coupler.

According to an embodiment, a phase detection method for detecting a phase error between an optical signal and a microwave signal in an integrated circuit is provided. The phase detection method may include outputting optical signals with a plurality of modes by a first multi-mode interference coupler that receives the optical signal, receiving one of the optical signals with the plurality of modes and a modulated signal generated through performing a phase modulation on another of the optical signals with the plurality of modes by the microwave signal, and outputting a first optical interference signal and a second optical interference signal, by a second multi-mode interference coupler, and detecting an electrical signal corresponding to a timing error between the optical signal and the microwave signal, by converting, to the electrical signal, information on an intensity difference between the first optical interference signal and the second optical interference signal that are output from the second multi-mode interference coupler.

According to another embodiment, a phase detection method for detecting a phase error between an optical signal and a microwave signal in an integrated circuit is provided. The phase detection method includes generating a first optical signal and a second optical signal by dividing an input optical signal, making a loop for two different ports, propagating the first optical signal and the second optical signal to the opposite directions, respectively, making an interference on a modulated signal that is phase modulated by the microwave signal input to the loop, and outputting a first optical interference signal and a second optical interference signal generated by the interference, by a multi-mode interference coupler, and detecting an electrical signal corresponding to a timing error between the optical signal and the microwave signal, by converting, to the electrical signal, information on an intensity difference between the first optical interference signal and the second optical interference signal that are output from the multi-mode interference coupler.

BRIEF DESCRIPTION OF THE DRAWINGS

FIG. 5C shows a graph where an additional bias is added in a practical case in consideration of variables such as a design error, a fabrication error, or the like.

DETAILED DESCRIPTION OF THE EMBODIMENTS

Figure 1:
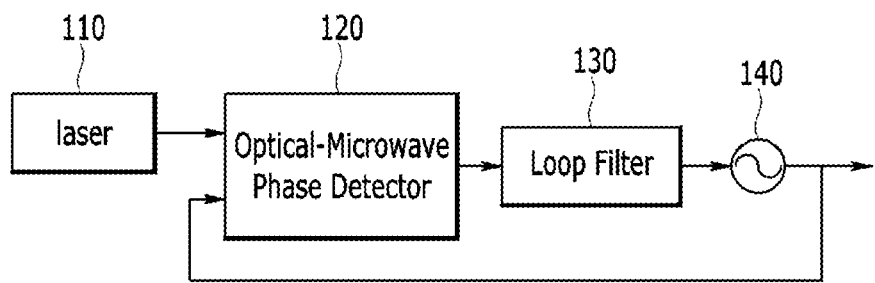
FIG. 1 shows a phase detection system according to an embodiment.

Hereinafter, embodiments will be described in detail with reference to the accompanying drawings. However, the scope of rights is not restricted or limited thereto. Like reference numerals in the drawings designate like elements through the specification. Though all terms used in the following description is chosen to be general and universal in the art to which this disclosure is related, other terms may be used depending on the development and/or change in technology, customs, and preference of a technician. Therefore, the terms used in the following description should be understood that they are example terms used for describing the embodiments and is not intended to limit the technical concept. In addition, in a certain case, there may be terms arbitrarily selected by the applicant and the meaning thereof will be described in detail in the corresponding description. Therefore, the terms used in the following description should be understood based on the meanings of the terms and the descriptions throughout the specification, rather than simply based on the terms themselves.

Description of Terms

The term "MMI coupler" means an optical power divider having an arbitrary distribution ratio using multi-mode interference (MMI). The power distribution is a fundamental part of integrated optics, and various application devices can be developed by arbitrarily adjusting the distribution ratio.

When an arbitrary input wave is input to a multi-mode waveguide, the input wave is divided into each mode of the multi-mode waveguide and separately propagates to make some magnetic images at a certain propagation distance. The MMI coupler will be additionally described with reference to FIG. 3.

Difficulty in Integrating a Phase Detector on a Circuit

FIG. 1 shows a phase detection system according to an embodiment. The phase detection system may include a laser 110, an optical-microwave phase detector 120, a loop filter 130, and a microwave voltage controlled oscillator (VCO) 140.

When optical pulses emitted from the laser 110 and a microwave signal are input into the optical-microwave phase detector 120, the phase detector 120 detects a phase error between the optical pulse and the microwave signal. The loop filter 130 filters an output signal.

Considering a conventional optical-microwave phase detector 120 carefully, an optical fiber Sagnac-loop is included therein, and the Sagnac-loop may include a Faraday rotator, a quarter wave plate, or the like. It is difficult to integrate the Faraday rotator and the wave plate in a chip, since the Faraday rotator includes a magnet.

In addition, in a phase detector using a conventional optical fiber-based 3×3 directional coupler, an output has a phase difference of 120° or −120°, since a plurality of optical fibers are arranged adjacently. However, the 3×3 directional coupler integrated as a chip does not have a phase difference of 120° or −120°, which makes it difficult to be integrated.

Figure 2:
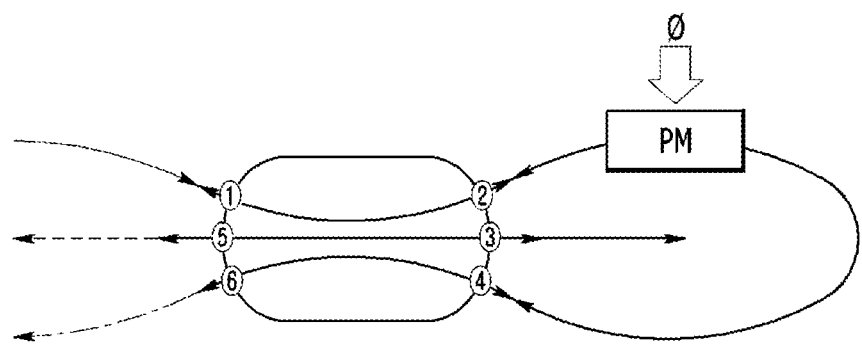
FIG. 2 shows a conventional 3×3 directional coupler-based phase detector according to an embodiment.

FIG. 2 shows a conventional 3×3 directional coupler-based phase detector according to an embodiment. Optical pulses are input into a first port, a second port and a fourth port are connected to make a loop, and a microwave input is received through a phase modulator (PM). The phase detector has a configuration that each input is synthesized in a central part and then output to a fifth port and a sixth port.

In a 3×3 directional coupler, the signals are synthesized by placing all optical fibers adjacent to each other in the central part. However, there may be some optical fibers adjacent to none of the optical fibers, since the optical fibers are laid out in a planar structure when integrated as a chip. As a result, the optical fiber-based 3×3 directional coupler cannot be used in an integrated circuit, in that it does not have the desired phase difference of 120° or −120° when integrated as a chip.

Figure 3:
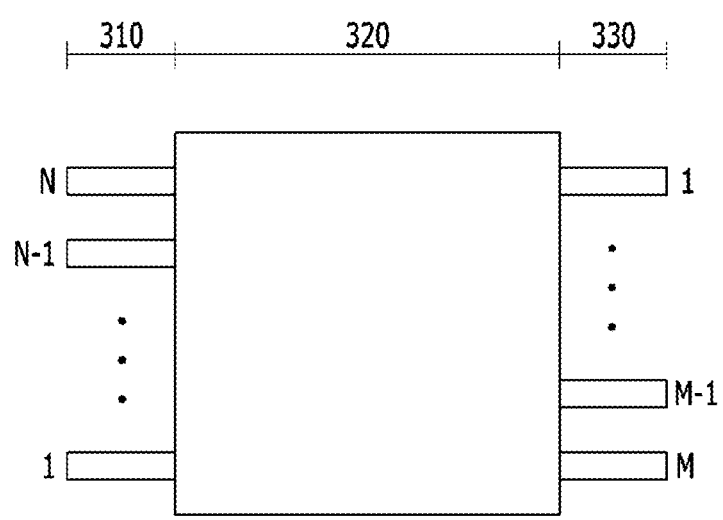
FIG. 3 shows an N×M MMI coupler according to an embodiment.

FIG. 3 shows an N×M MMI coupler according to an embodiment. The N×M MMI coupler according to an embodiment includes access waveguides 310 and 330, and a multimode waveguide 320.

An input access waveguide 310 may receive N input signals, and a signal input into the input access waveguide 310 is converted into a plurality of modes in the multi-mode waveguide 320. The signal converted into the plurality of modes is output to an output access waveguide 330. At this time, the number of output may be M and the output power of each node may be substantially equally distributed.

Since the directional coupler synthesizes signals by placing the optical fibers adjacently, the directional coupler according to an embodiment is very sensitive to a gap between adjacent waveguides. Meanwhile, the MMI coupler requires the lowest process precision among all types of couplers.

Figure 4:
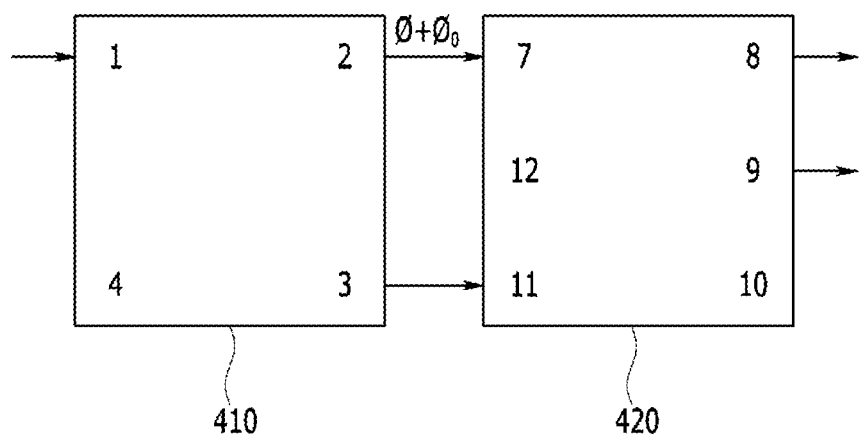
FIG. 4 shows an MMI coupler-based phase detector according to an embodiment.

FIG. 4 shows an MMI coupler-based phase detector according to an embodiment. FIG. 4 describes a phase detector integrated as a chip using the MMI coupler described with reference to FIG. 3.

The MMI coupler-based phase detector according to an embodiment may include a first MMI coupler 410 and a second MMI coupler 420. According to the embodiment of FIG. 4, the first MMI coupler 410 may be configured with a 2×2 MMI coupler having two input ports and two output ports, and the second MMI coupler 420 may be configured with a 3×3 MMI coupler having three input ports and three output ports.

The first MMI coupler 410 receives an optical pulse signal and outputs optical pulse signals with a plurality of modes. Specifically, the first MMI coupler 410 receives the optical pulse signal at port 1 and outputs the optical pulse signal to port 2 and port 3. A power of an optical pulse signal output from port 2 is substantially equal to that of an optical pulse signal output from port 3, but phases of the optical pulse signals output from port 2 and port 3 may be different.

The second MMI coupler 420 receives one of the optical signals with the plurality of modes and a modulated signal generated through performing a phase modulation on another of the optical signals with the plurality of modes by the microwave signal, and outputs a first optical interference signal and a second optical interference signal.

More specifically, a phase $\varphi$ adjusted by a phase shifter and a phase $\varphi_0$ adjusted by a bias unit are added to an output signal from port 2 and, a result of such addition is input to port 7 of the second MMI coupler 420.

An output signal from port 3 of the first MMI coupler 420 is input to port 11 of the second MMI coupler 420.

The second MMI coupler 420 may make the signals input to the two ports 7 and 9 interfere, and output a first optical interference signal and a second optical interference signal to port 8 and port 9, respectively.

Using the first MMI coupler 410 and the second MMI coupler 420 may make possible output the first optical interference signal and the second optical interference signal, and detect a phase error by analyzing the two optical interference signals through a balanced optical detector.

According to an embodiment, a bias unit that biases a phase of either the first optical interference signal or the second optical interference signal may be further included. The bias unit may bias the phase so as to have a maximum sensitivity, when a phase difference between the first interference signal and the second interference signal becomes zero.

In addition, the bias unit may bias the phase corresponding to a fabrication error of the second MMI coupler 420. That is, the phase may be biased with different magnitude for each MMI coupler.

A balanced optical detector (not shown in the accompanying drawings) may detect an electrical signal corresponding to a timing error between the optical signal and the microwave signal, by converting, to the electrical signal, information of an intensity difference between the first optical interference signal and the second optical interference signal that are output from the second multi-mode interference coupler.

Figure 5A:
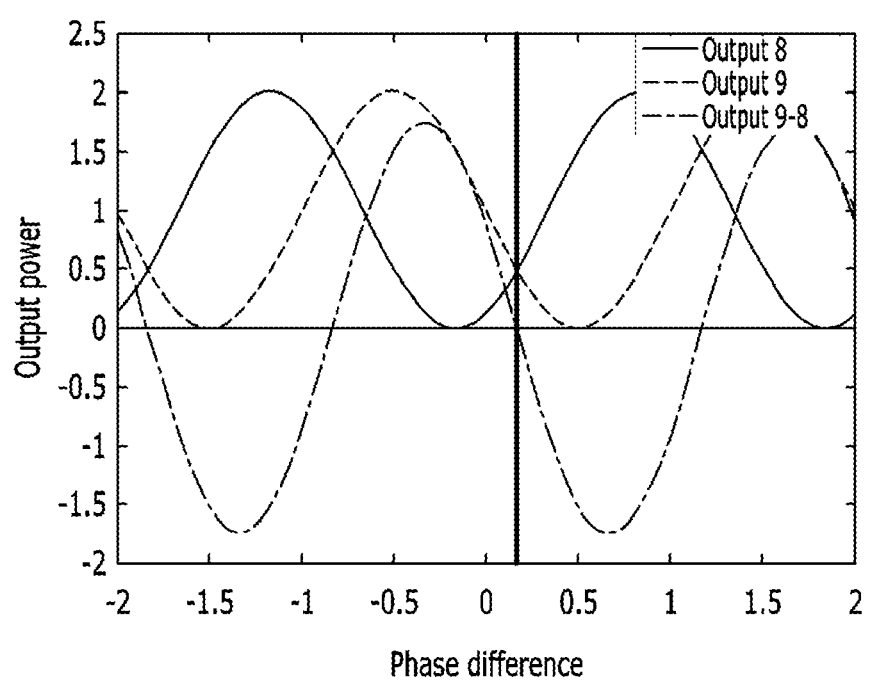
FIG. 5A shows a graph describing a case that a maximum sensitivity is not brought at the point where a phase difference is zero due to the absence of a bias unit.
Figure 5B:
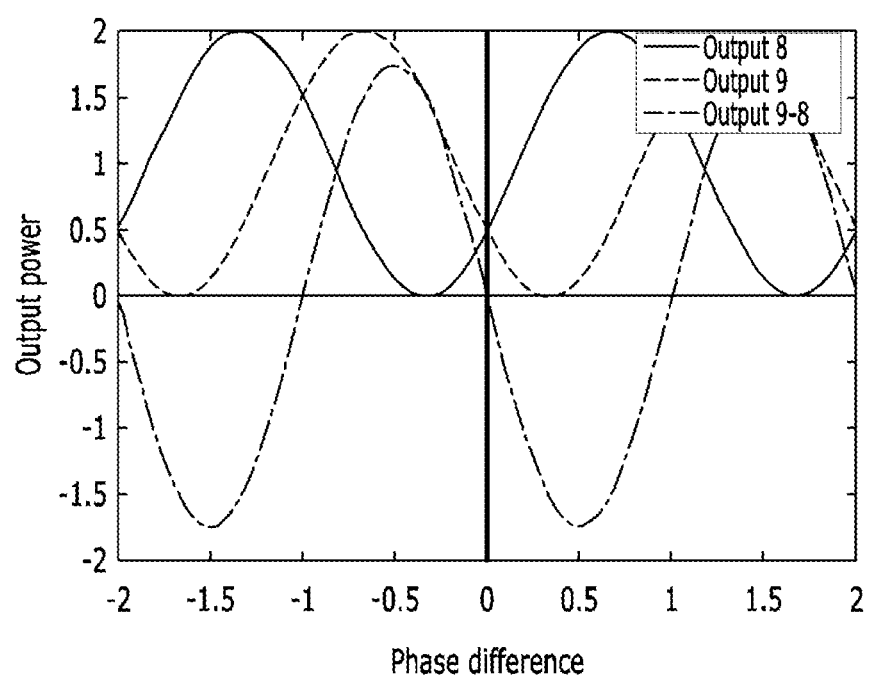
FIG. 5B shows a graph describing a case that the maximum sensitivity is adjusted to be brought at the point where the phase difference is zero in the presence of a bias unit.
Figure 5C:
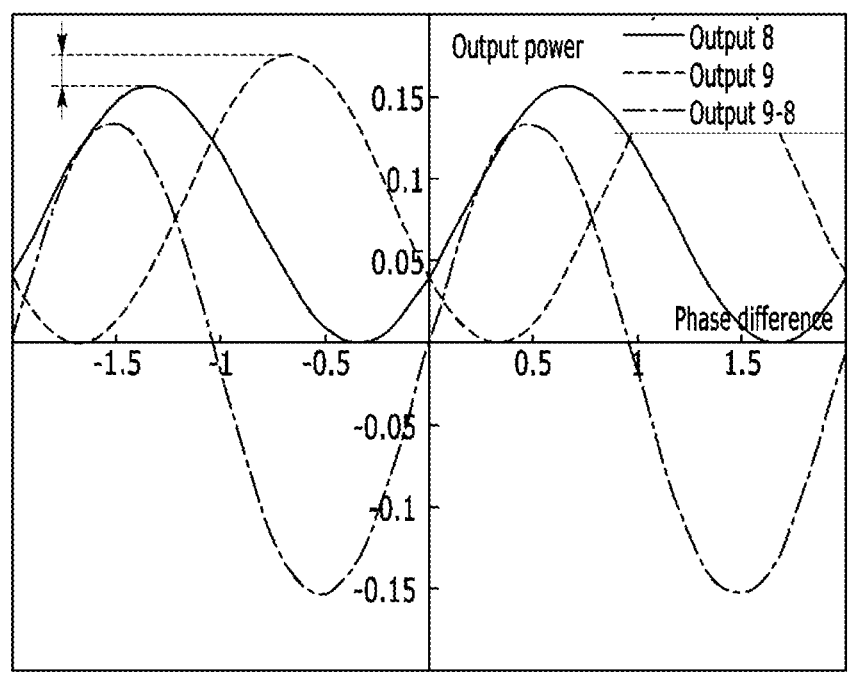

FIG. 5A to FIG. 5C show output signals of an MMI coupler specifically. Each of FIG. 5A to FIG. 5C shows a signal output from port 8 and a signal output form port 9 of a second MMI coupler, and also a difference between the two signals.

FIG. 5A shows an output signal of the second MMI coupler 420 in the absence of a phase bias $\varphi_0$, according to an embodiment. Referring to FIG. 5A, when a microwave signal $\varphi$ adjusted by a phase shifter is zero, output power does not become zero. That is, it can be seen that a maximum sensitivity is not brought at the point where a phase difference is zero due to the absence of a bias unit. At the point where the output power becomes zero, there exists a phase difference of about 0.15.

FIG. 5B shows an output signal of the second MMI coupler 420 when a phase bias $\varphi_0$ exists, according to an embodiment. FIG. 5B is a graph that is adjusted to have a maximum sensitivity at a point where a phase difference is zero, including a bias unit. However, at this time, both of FIGS. 5A and 5B are graphs showing ideal cases where the output powers from the three ports are completely equal, and a case where practical parameters are considered is shown in FIG. 5C.

Specifically, a signal to which a phase bias $\varphi_0$ of 0.167 is applied is shown. Here, when the microwave signal $\varphi$ controlled by a phase shifter is zero, an output power becomes zero.

FIG. 5C shows a case where a maximum sensitivity condition is satisfied by biasing an output using a bias unit according to an embodiment. FIG. 5C shows a graph in a practical case when additional bias is applied considering parameters such as a design error, a fabrication error, or the like.

Specifically, an output from port 9 may be biased so as to compensate for a difference with an output from port 8 and thereby the maximum sensitivity condition may be satisfied. For example, a compensation to make 0.167 rad to 0.177 rad may be performed.

Consequently, both of FIG. 5A and FIG. 5B shows cases where a phase shifter is applied, but the graph shown in FIG. 5B shows a case where the bias unit is used. FIG. 5C shows a case where an additional bias is performed in consideration of practical parameters.

According to another embodiment, a magnitude of biased phase may be adjusted in response to a fabrication error of an MMI coupler.

Figure 6:
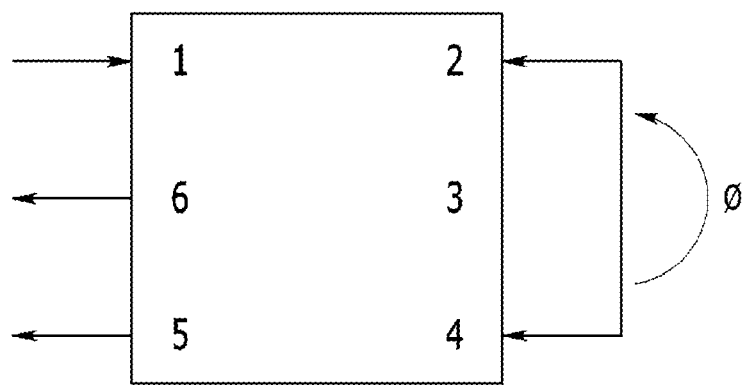
FIG. 6 shows a loop structure-based phase detector according to an embodiment.

FIG. 6 shows a loop structure-based phase detector according to an embodiment. The loop structure-based phase detector according to an embodiment may be integrated as a chip like the phase detector shown in FIG. 4.

Specifically, a loop may be made by connecting an output from port 2 and an output from port 4 of the MMI coupler. The microwave signal $\varphi$ is input to the loop, and the MMI coupler outputs a first optical interference signal to port 5 and a second optical interference signal to port 6.

That is, the first optical signal and the second optical signal are generated by dividing an input optical signal, and a loop is made for two different ports (port 2 and port 4). Interference on a modulated signal that is phase modulated by a microwave signal $\varphi$ input to the loop is performed by propagating the first optical interference signal and the second optical interference signal to opposite directions of the loop. Then, the first optical interference signal and the second optical interference signal that are generated by the interference may be output to port 5 and port 6, respectively.

According to an embodiment, an isolator that prevents a reflection may be connected to a port (port 1) to which an optical signal of the MMI coupler is input. In some cases, an isolator may be placed outside a chip where the MMI coupler is integrated.

According to another embodiment, preferably a loop may be formed for a first output port (port 2) and a third output port (port 4) that is not adjacent to the first output port (port 2) of the MMI coupler. In some cases, a loop may be formed for a first output port (port 2) and a second output port (port 3) adjacent to the first output port (port 2).

In an embodiment, a uni-directional phase shifter that propagates a phase of a microwave signal φ input into the loop to only a specific direction may be further included.

Finally, the loop-structured MMI coupler-based phase detector may further include a balanced optical detector that detects an electrical signal corresponding to a timing error between the optical signal and the microwave signal, by converting, to the electrical signal, information of an intensity difference between the first optical interference signal and the second optical interference signal that are output from the multi-mode interference coupler.

Each of FIG. 7 to FIG. 10 shows an MMI coupler-based phase detection system according to an embodiment.

Figure 7:
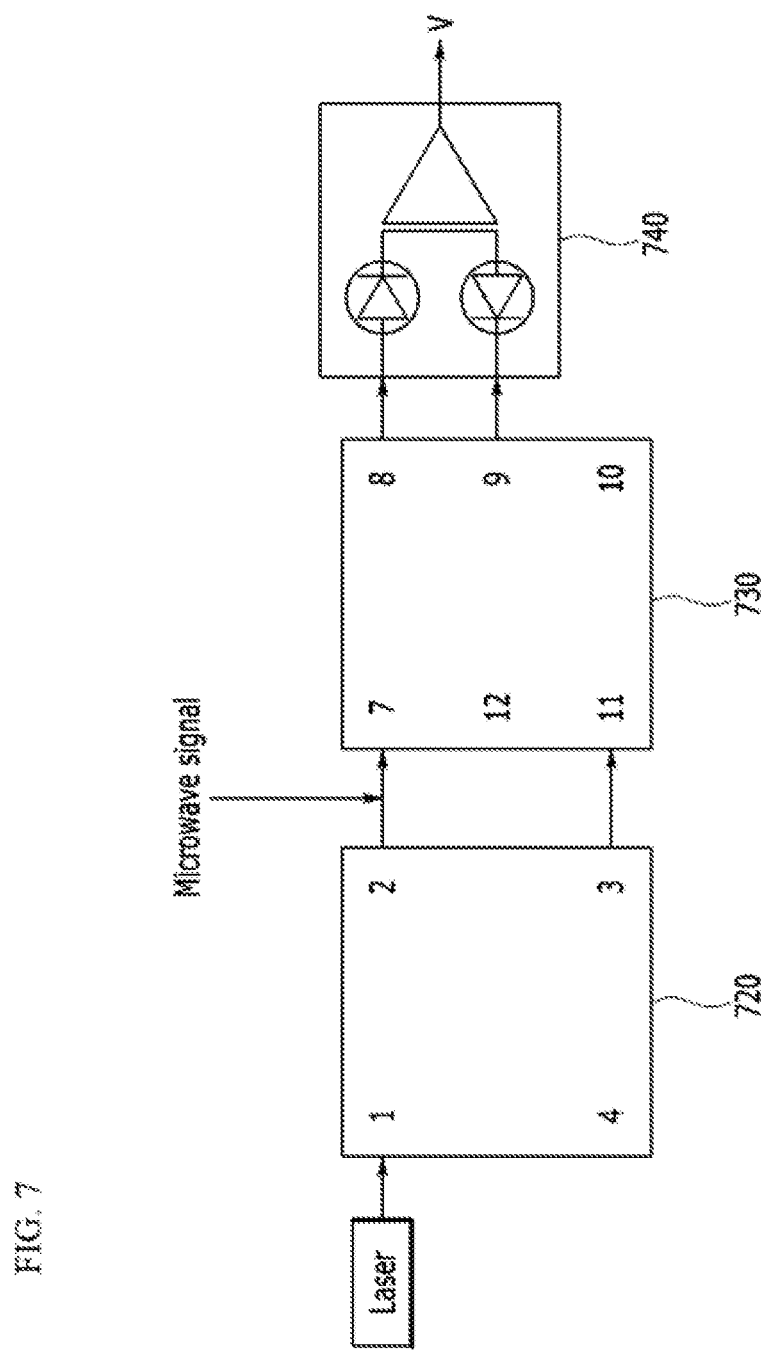
FIG. 7, FIG. 8, FIG. 9 and FIG. 10 show an MMI coupler-based phase detection system according to an embodiment.

Referring to FIG. 7, a laser 710 may output an optical pulse, and the optical pulse may be input to port 1 of a first MMI coupler 720. Here, the laser 710 may be a mode locked laser, but not limited thereto.

The first MMI coupler 720 that receives the optical pulse may output optical interference signals of same power to port 2 and port 3, respectively. The optical interference signal output from the port 2 is input to the port 7 of a second MMI coupler 730 after being added to a microwave signal input that is output from a microwave VCO (not shown in FIG. 7). The optical interference signal output from port 3 of the first MMI coupler 720 may be input to port 11 of the second MMI coupler 730.

The second MMI coupler 730 may receive the optical interference signals, output the first optical interference signal at port 8, and output the second optical interference signal at port 9. The first optical interference signal and the second optical interference signal output by the second MMI coupler 730 are input to a balanced optical detector 740.

The balanced optical detector 740 may detect an electrical signal corresponding to a timing error between the optical signal and the microwave signal, by converting, to the electrical signal, information of an intensity difference between the first optical interference signal and the second optical interference signal.

Input ports and output ports of the first MMI coupler 720 and the second MMI coupler 730 may be variously modified from a point of view of a person skilled in the art related to a phase detector. Further, a MMI coupler of a loop structure may be used instead of the first MMI coupler 720 and the second MMI coupler 730.

The MMI coupler-based phase detector shown in FIG. 4 or FIG. 7 may be integrated as a chip. Further, since the optical pulse signal and the microwave signal are configured to go straight without a loop structure, an isolator may be not required inside and outside the chip. In addition, a uni-directional phase shifter may be not required.

Figure 8:
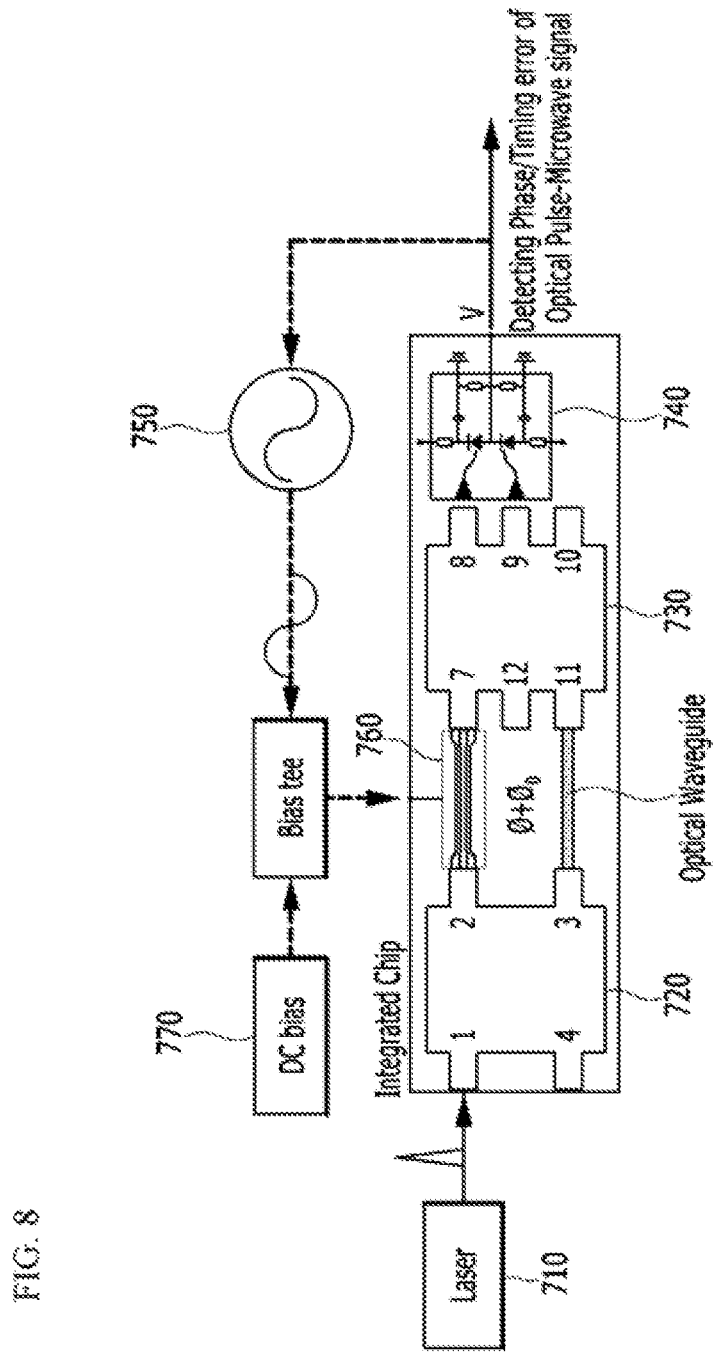
Figure 9:
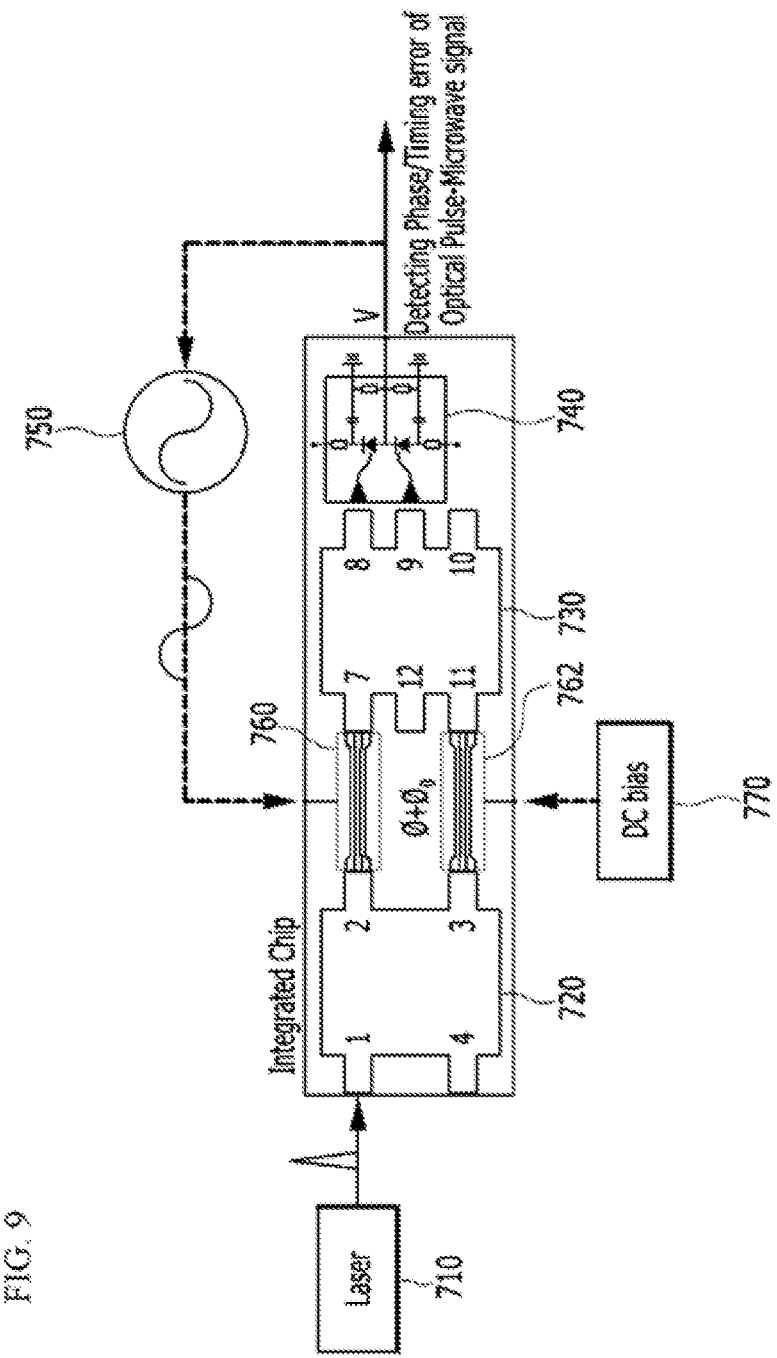

For example, the MMI coupler-based phase detector described in FIG. 4 or 7 may include a bias unit as shown in FIG. 8 and FIG. 9. When a first MMI coupler 720 and a second MMI coupler 730 are used, the bias unit 770 may be used so as to have maximum sensitivity in the absence of a phase difference. A bias unit 770 may be a DC bias device for DC-induced phase shift.

Referring to FIG. 8 and FIG. 9, the first MMI coupler 720, the second MMI coupler 730, and the balanced optical detector 740 shown in FIG. 7 may be integrated as a silicon chip. An optical pulse train of the laser 710 is input to the first MMI coupler 720, and an electrical signal is output from the balanced optical detector 740. An optical interference signal output from the first MMI coupler 720 is input to port 7 of the second MMI coupler 730. At this time, a microwave signal output from a VCO 750 may be added in a phase shifter 760 placed between port 2 and port 3.

Here, a phase bias provided by a bias unit 770 may be applied at the phase shifter 760 as shown in FIG. 8. Alternatively, as shown in FIG. 9, the phase bias provided by the bias unit 770 may be applied at a phase shifter 762 placed between port 3 and port 11.

Meanwhile, the loop-structured MMI coupler-based phase detector described in FIG. 6 is not required to bias a phase when a loop is formed by connecting a first output port (port 2) and a third output port (port 4) not adjacent to the first output port. Thus, the phase may be detected when a separate bias unit is not included.

Figure 10:
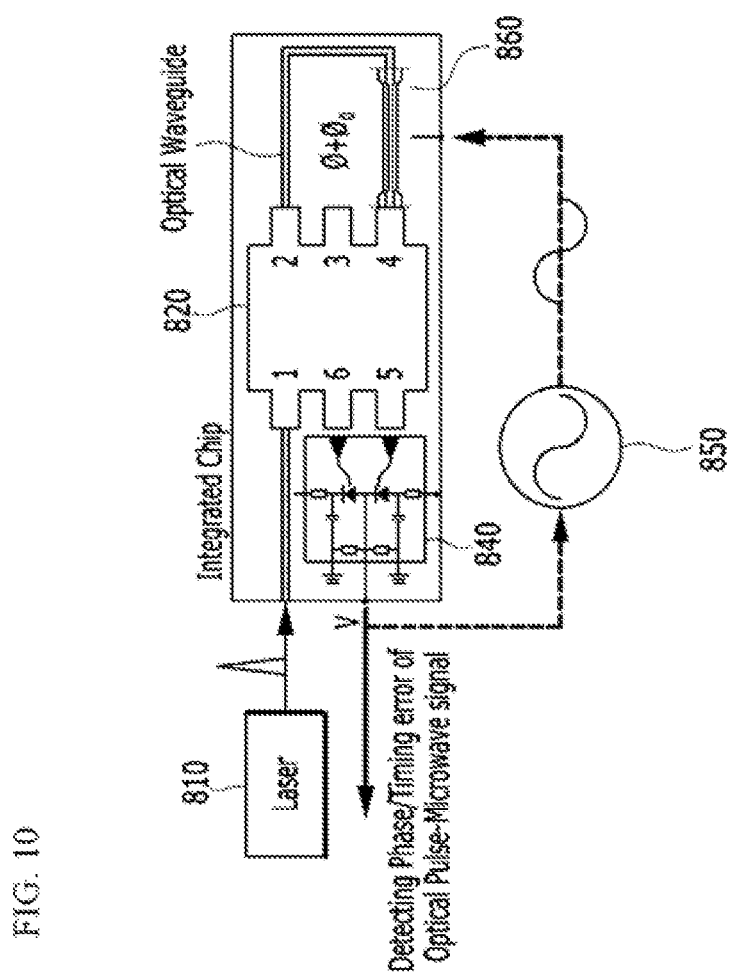

Referring to FIG. 10, a loop-structured MMI coupler-based phase detector described in FIG. 6 makes a loop by connecting an output of port 2 and an output of port 4 of an MMI coupler 820. Here, the MMI coupler 820 and a balanced optical detector 840 may be integrated as a silicon chip.

An optical pulse train of a laser 810 is input to the MMI coupler 820, and each of optical signals output from port 2 and port 4 of the MMI coupler 820 propagates to the opposite direction of the loop, respectively. A microwave signal output from a VCO 850 may be added at a phase shifter 860 implemented in the loop. Then, the MMI coupler 820 interferes with a modulated signal which is phase modulated by the microwave signal φ in the loop, and a first optical interference signal and a second interference signal generated by the interference may be output to port 5 and port 6, respectively.

The apparatus described above may be implemented as a hardware component, a software component, and/or a combination of hardware components and software components. For example, the apparatus and components described in the embodiments may be implemented using at least one computer or special purpose computer, such as a processor, a controller, an arithmetic logic unit (ALU), a digital signal processor, a microcomputer, a field programmable array (FPA), a microprocessor, or any other apparatus that can execute and response to instructions, or the like. A processing device may execute an operating system (OS) and one or more software applications that are executed thereon. The processing device may also access, store, manipulate, process, and generate data in response to the execution of the software. In order to facilitate understanding, it may be described that one processing unit is used. However, a person skilled in the art may understand that the processing device may include a plurality of processing elements and/or a plurality of types of processing elements. For example, the processing device may include a plurality of processors, or one processor and one controller. In addition, other processing configuration such as a parallel processor may be available.

The software may include a computer program, a code, instructions, or a combination thereof. Further, the software may configure the processing unit to operate as desired, or instruct the processing device independently or collectively. In order to be interpreted by the processing device or provide instructions or data to the processing device, software and/or data may embodied permanently or temporarily in any type of machine, a component, a physical equipment, a virtual equipment, a computer storage medium or device or a propagated signal wave. The software may be distributed over computer systems connected via a network, and be stored or executed in a distributed manner. The software and data may be stored on one or more computer readable recording media.

The method according to the example embodiments of the present disclosure may be implemented in the form of program instructions that can be executed by various computing devices and recorded in a computer readable medium. The computer readable medium may include, alone or in combination with the program instructions, data files, data structures, and the like. The program instructions recorded in the medium may be those specially designed and constructed for the purposes of the embodiments, or may be well-known and available to the person skilled in the art of computer software. The computer readable recording medium may be a magnetic medium (a hard disk, a floppy disk, or a magnetic tape), an optical media (a CD-ROM, or a DVD), a magneto-optical medium (a floptical disk), a hardware device (a ROM, a RAM, a flash memory) specifically configured to store and execute program instructions, or the like. The program instructions may be a machine language code generated by a compiler and a high-order language code that can be executed by a computer using an interpreter or the like. The hardware device may be configured to operate as one or more software modules to perform the operations of the embodiments, and vice versa.

While the embodiments have been described with reference to limited drawings, a person skilled in the art may verify and modify from the above description. For example, a desired result may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims also fall within the scope of following claims.

What is claimed is:

1. An integrated phase detector for detecting a phase error between an optical signal and a microwave signal, the phase detector comprising:
   a first multi-mode interference coupler that receives the optical signal and outputs optical signals with a plurality of modes; and
   a second multi-mode interference coupler that receives one of the optical signals with the plurality of modes and a modulated signal generated through performing a phase modulation on another of the optical signals with the plurality of modes by the microwave signal, and outputs a first optical interference signal and a second optical interference signal.

2. The phase detector of claim 1, further comprising a bias unit that biases a phase of either the first optical interference signal or the second optical interference signal.

3. The phase detector of claim 2, wherein the bias unit biases the phase to have a maximum sensitivity when a phase difference between the first optical interference signal and the second optical interference signal is zero.

4. The phase detector of claim 2, wherein the bias unit biases the phase in response to a fabrication error of the second multi-mode interference coupler.

5. The phase detector of claim 1, further comprising
   a balanced optical detector that detects an electrical signal corresponding to a timing error between the optical signal and the microwave signal, by converting, to the electrical signal, information of an intensity difference between the first optical interference signal and the second optical interference signal that are output from the second multi-mode interference coupler.

6. The phase detector of claim 1, wherein the first multi-mode interference coupler is a 2×2 multi-mode interference coupler having two input ports and two output ports, and wherein the second multi-mode interference coupler is a 3×3 multi-mode interference coupler having three input ports and three output ports.

7. The phase detector of claim 1, further comprising
   a phase modulator that modulates an optical signal output from the first multi-mode interference coupler by using the microwave signal.

8. An integrated phase detector for detecting a phase error between an optical signal and a microwave signal, the phase detector comprising:
   a multi-mode interference coupler that generates a first optical signal and a second optical signal by dividing an input optical signal, makes a loop for two different ports, propagates the first optical signal and the second optical signal to the opposite directions, respectively, makes an interference on a modulated signal that is phase modulated by the microwave signal input to the loop, and outputs a first optical interference signal and a second optical interference signal generated by the interference.

9. The phase detector of claim 8, further comprising
   an isolator that is connected to a port to which the optical signal of the multi-mode interference coupler is input and prevents reflection of the optical signal.

10. The phase detector of claim 9, wherein the loop is made for a first output port of the multi-mode interference coupler and a third output port of the multi-mode interference coupler that is not adjacent to the first output port.

11. The phase detector of claim 10, further comprising
    a uni-directional phase shifter that shifts a phase of the microwave signal that is input to the loop only in a specific direction.

12. The phase detector of claim 11, wherein a balanced optical detector that detects an electrical signal corresponding to a timing error between the optical signal and the microwave signal, by converting, to the electrical signal, information on an intensity difference between the first optical interference signal and the second optical interference signal that are output from the multi-mode interference coupler.

13. A phase detection method for detecting a phase error between an optical signal and a microwave signal in an integrated circuit, the method comprising:
    outputting optical signals with a plurality of modes by a first multi-mode interference coupler that receives the optical signal;
    receiving one of the optical signals with the plurality of modes and a modulated signal generated through performing a phase modulation on another of the optical signals with the plurality of modes by the microwave signal, and outputting a first optical interference signal and a second optical interference signal, by a second multi-mode interference coupler; and
    detecting an electrical signal corresponding to a timing error between the optical signal and the microwave signal, by converting, to the electrical signal, information on an intensity difference between the first optical interference signal and the second optical interference signal that are output from the second multi-mode interference coupler.

14. A phase detection method for detecting a phase error between an optical signal and a microwave signal in an integrated circuit, the method comprising:
    generating a first optical signal and a second optical signal by dividing an input optical signal, making a loop for two different ports, propagating the first optical signal and the second optical signal to the opposite directions, respectively, making an interference on a modulated signal that is phase modulated by the microwave signal input to the loop, and outputting a first optical interference signal and a second optical interference signal generated by the interference, by a multi-mode interference coupler; and detecting an electrical signal corresponding to a timing error between the optical signal and the microwave signal, by converting, to the electrical signal, information on an intensity difference between the first optical interference signal and the second optical interference signal that are output from the multi-mode interference coupler.

* * * * *